(12) United States Patent
Risager et al.

(10) Patent No.: US 8,123,477 B2
(45) Date of Patent: Feb. 28, 2012

(54) CONTROL OF ROTOR DURING A STOP PROCESS OF A WIND TURBINE

(75) Inventors: Lars Risager, Ry (DK); Keld Hammerum, Hadsten (DK)

(73) Assignee: Vestas Wind Systems A/S, Aarhus N (DE)

( * ) Notice: Subject to any disclaimer, the term of this patent is extended or adjusted under 35 U.S.C. 154(b) by 0 days.

(21) Appl. No.: 12/687,719

(22) Filed: Jan. 14, 2010

(65) Prior Publication Data

US 2010/0119369 A1   May 13, 2010

Related U.S. Application Data

(63) Continuation of application No. PCT/DK2008/000261, filed on Jul. 11, 2008.

(30) Foreign Application Priority Data

Jul. 14, 2007  (DK) .................................. 2007 01047

(51) Int. Cl.
F03D 7/04 (2006.01)
F03D 7/02 (2006.01)
(52) U.S. Cl. ............................................. 416/1; 416/41
(58) Field of Classification Search ................ 416/1, 27, 416/40, 41
See application file for complete search history.

(56) References Cited

U.S. PATENT DOCUMENTS

| 4,193,005 | A | 3/1980 | Kos et al. |
| 4,435,647 | A | 3/1984 | Harner et al. |
| 6,876,099 | B2 | 4/2005 | Wobben |
| 7,218,012 | B1 | 5/2007 | Edenfeld |
| 7,878,760 | B2 * | 2/2011 | Stommel ............................ 416/1 |
| 2004/0108729 | A1 | 6/2004 | Wobben |
| 2006/0033338 | A1 | 2/2006 | Wilson |
| 2007/0018457 | A1 | 1/2007 | Llorente |
| 2007/0116572 | A1 | 5/2007 | Barbu et al. |

FOREIGN PATENT DOCUMENTS

| DE | 102006001613 A1 | 7/2007 |
| EP | 1701034 A2 | 9/2006 |
| EP | 1719910 A1 | 11/2006 |
| EP | 1788237 A2 | 5/2007 |
| WO | 9007823 A1 | 7/1990 |
| WO | 2006007838 A1 | 1/2006 |
| WO | 2007012487 A1 | 2/2007 |
| WO | 2009010059 A2 | 1/2009 |

OTHER PUBLICATIONS

Danish Search Report; PA 2007 01047; Feb. 21, 2008; 1 page.
International Search Report; PCT/DK2008/000261; Jun. 26, 2009; 3 pages.
Bossanyi E A: "The Design of Closed Loop Controllers for Wind Turbines" Wind Energy, Wiley, vol. 3, No. 3, Jan. 1, 2000, pp. 149-163, XP007908706 ISSN: 1095-4244 [retrieved on Jul. 7, 2001] pp. 155-158.

* cited by examiner

*Primary Examiner* — Edward Look
*Assistant Examiner* — Dwayne J White
(74) *Attorney, Agent, or Firm* — Wood, Herron & Evans, L.L.P.

(57) ABSTRACT

A method for controlling a wind turbine rotor during a stop process by pitching the rotor blades fast, e.g. with an angular rate of 10-15°/s to a no-thrust position, after which the rotor blades are pitched to maintain the no-thrust or a thrust against the direction of the pendulum movement of the tower for a while to prevent the aerodynamic thrust from aggravating the pendulum movement of the tower. With this control strategy, the bending moments of the tower root are minimized, leading to avoidance of wind turbine tower failure, to prolongation of the life time for a wind turbine tower and the possibility of erecting wind turbine towers of less reinforcement at the tower root.

15 Claims, 5 Drawing Sheets

CONTROL OF ROTOR DURING A STOP PROCESS OF A WIND TURBINE

CROSS-REFERENCE TO RELATED APPLICATIONS

The present application is a continuation of pending International patent application PCT/DK2008/000261 filed on Jul. 11, 2008 which designates the United States and claims priority from Danish patent application PA 2007 01047 filed on Jul. 14, 2007, the content of which is incorporated herein by reference.

FIELD OF THE INVENTION

The present invention relates to a method and a control device for controlling the pitching of the rotor blades during a stop process of a wind turbine.

BACKGROUND OF THE INVENTION

It is well-known that the blades of a pitch-regulated or active stall regulated wind turbine when it is stopped are pitched to a feathered parking position where an edge of the blade is directed towards the wind turbine tower and the other edge is directed away from the tower, so that aerodynamic forces from the wind on the blades will not cause harm to the wind turbine. Such stops are performed for maintenance of the turbine, at low wind periods and very high wind periods as well as for emergency stop of the operation of the wind turbine due to malfunction of the turbine itself of problems on the electrical grid which may cause the wind turbine to halt the emission of active power to the grid, such as a severe reduction of the grid voltage.

A rapid pitching of the blades may cause harm to the blades and to the wind turbine as described e.g. in international patent application WO 2006/007838 (Vestas), which discloses a method of controlling the pitch rate by rapidly pitching the blades to a position where the acceleration force on the rotor is zero, i.e. that the rotation of the rotor is not accelerated, followed by a slower pitching rate to the parking position.

In European patent application EP 1 701 034 (Winwind) is disclosed a method of stopping the rotor of a wind turbine where account is taken to reduce the pendulum motion of the wind turbine tower that is caused when the positive thrust on the rotor during normal operation providing a deflection of the tower in the downwind direction is replaced by a negative thrust when the blades are pitched towards the parking position, so that the tower when moving towards the wind from the deflected position is accelerated towards the wind direction, causing a huge bending moment on the base of the tower. This is counteracted by pitching with a high angle speed of e.g. 15°/s until the tower is about its vertical position and then reduce the angle speed to e.g. 5°/s or even 0°/s until the extreme position of the tower in the upwind direction is reached, where after the high angle speed is resumed until the parking position of the blades is reached.

It is an object of the present invention to provide a stop process of the wind turbine where the extreme bending moment applied to the wind turbine tower is reduced.

SUMMARY OF THE INVENTION

The present invention provides an advantageous solution to the above stated problem by pitching the rotor blades fast, e.g. with a angular rate of 10-15°/s to a no-thrust position, after which the rotor blades are pitched to maintain the no-thrust or a thrust against the direction of the pendulum movement of the tower for a while to prevent the aerodynamic thrust from aggravating the pendulum movement. With this control strategy, the huge bending moments of the tower root that for a simple stop process with a constant angular pitching rate may reach a magnitude of 2.5 times the maximum bending moment under ordinary operation, may be avoided, leading to avoidance of wind turbine tower failure, to prolongation of the life time for a wind turbine tower and the possibility of erecting wind turbine towers of less reinforcement at the tower root.

The no-thrust position may be e.g. a predetermined pitch angle or it may preferably be determined by means of measuring operational data of the wind turbine. Use may be made of the fact that the operational conditions of no-thrust and no acceleration of the rotor normally substantially coincide for a pitch-controlled, variable speed wind turbine so that a no-thrust position is found when the acceleration force on the rotor is zero, i.e. that the rotation of the rotor is not accelerated, given that the generator is not taking up power from the rotor, such as during a severe voltage drop on the distribution grid, or it may be detected from the active power output from the wind turbine generator in cases where the generator is still in operation. As a further alternative, the torque on the main shaft connecting the rotor hub and the generator or a gearbox may be detected by means of e.g. a strain gauge. A no-thrust position may also be detected from measurements of the deformation of the rotor blades, e.g. by means of strain gauges or other detectors in the blades. In a preferred embodiment, the stop process of the present invention is implemented for emergency stops, where the generator is not producing power to the distribution grid and the no-thrust position may be detected by means of the output from a tachometer measuring the rotational speed of the wind turbine rotor, of a main shaft or of a shaft of the gear box, where a constant rotational speed indicates a position of no aerodynamic thrust force on the rotor.

Thus the present invention relates to a method for controlling the pitch angle of the blades of a wind turbine rotor during a stop process of the rotor from an operating state, where the wind turbine tower is deflected in a downwind direction due to the aerodynamic thrust force on the rotor, the method comprising the steps of pitching the blades to a position where the aerodynamic thrust force on the rotor is substantially zero, and subsequently controlling the aerodynamic thrust force on the rotor to be either substantially zero or to be against the direction of movement of the tower in its first natural eigen-frequency mode, at least until the tower of the wind turbine has reached a substantially vertical position after having reached the extreme deflection position in the upwind direction, in a preferred embodiment at least until the tower of the wind turbine again has reached the extreme deflection position in the downwind direction, i.e. in the direction of the initial deflection of the tower away from the direction of the wind.

It is preferred that the position where the aerodynamic thrust force on the rotor is substantially zero is maintained after said pitching of the blade at least until the tower of the wind turbine has reached a substantially vertical position. In a further preferred embodiment, the blades are maintained at a position where the aerodynamic thrust force on the rotor is substantially zero until the tower from the initial bending has reached the opposite extreme bending position in the upwind direction.

After the tower from the initial bending has reached the opposite extreme bending position in the upwind direction, it is advantageous that the method comprises the step of pitching the blades to a position where the aerodynamic thrust force on the rotor is directed in the upwind direction, so that the pendulum motion of the tower is actively counteracted by the aerodynamic forces on the rotor. This second pitching is preferably conducted at a lower pitch angle rate that the first pitching, i.e. within a range of 4 to 8°/s.

The blades may be maintained at the position where the aerodynamic thrust force on the rotor is substantially zero for a time period in the range of 0.2 to 0.4 times the period of the first natural eigen-frequency of the wind turbine tower bending mode, i.e. the time period may be predetermined from knowledge of the vibration properties of the wind turbine in that said eigen-frequency is established for the assembled, operational wind turbine with nacelle and rotor, as an alternative to determine the onset of the various steps of the method by means of measurements on the wind turbine.

In an alternative embodiment, the method comprises the step of
pitching the blades to a position where the aerodynamic thrust force on the rotor is directed in the downwind direction when the tower from the initial bending has reached the substantially vertical position, whereby the pendulum motion of the tower is counteracted already before the upwind extreme position has been reached.

The blades may be maintained at the position where the aerodynamic thrust force on the rotor is substantially zero by means maintaining a constant blade pitch angle or by adjusting the angle in accordance to an expected or a measured change in the rotational speed of the rotor and/to a measured wind speed. It is however preferred that a repeated adjustment of the pitch angle of the blades is performed by means of a control procedure based on the step of determining a measure of the aerodynamic thrust force on the rotor, e.g. by measuring the active power output from the generator of the wind turbine.

The step of controlling said pitching of the blades to a position where the aerodynamic thrust force on the rotor is substantially zero may in general comprise the step of determining a measure of the aerodynamic thrust force on the rotor and perform the control in response hereto.

The method of the present invention may further comprise the step of determining a measure of the movement of the top of the tower, preferably including the velocity of the top of the tower, and perform the control of the steps in accordance hereto.

The present invention furthermore relates to a wind turbine preferably having variable pitch control or active stall control of the blades and comprising a control system having means for controlling a stop process of the wind turbine rotor according to the herein described method of the invention. The reversing of the velocity may be employed to determine the extreme positions of the top of the wind turbine tower, and an integration of the velocity may be employed to determine the position of the tower top, in particular the vertical position, which may be used to control the performance of certain steps of the method.

The control system of the present invention may be an integrated part of a pitch control system of the wind turbine for ordinary operation of the wind turbine, but it is preferred that the control system constitutes a safety stop system operating independently from a pitch control system of the wind turbine.

BRIEF DESCRIPTION OF THE DRAWINGS

An embodiment of the invention will be described in the following with reference to the enclosed drawing of which

The figures are provided to illustrate and support the understanding of the invention and are not to be regarded as limiting of the scope of protection defined by the appended claims.

DETAILED DESCRIPTION OF THE INVENTION

Figure 1:
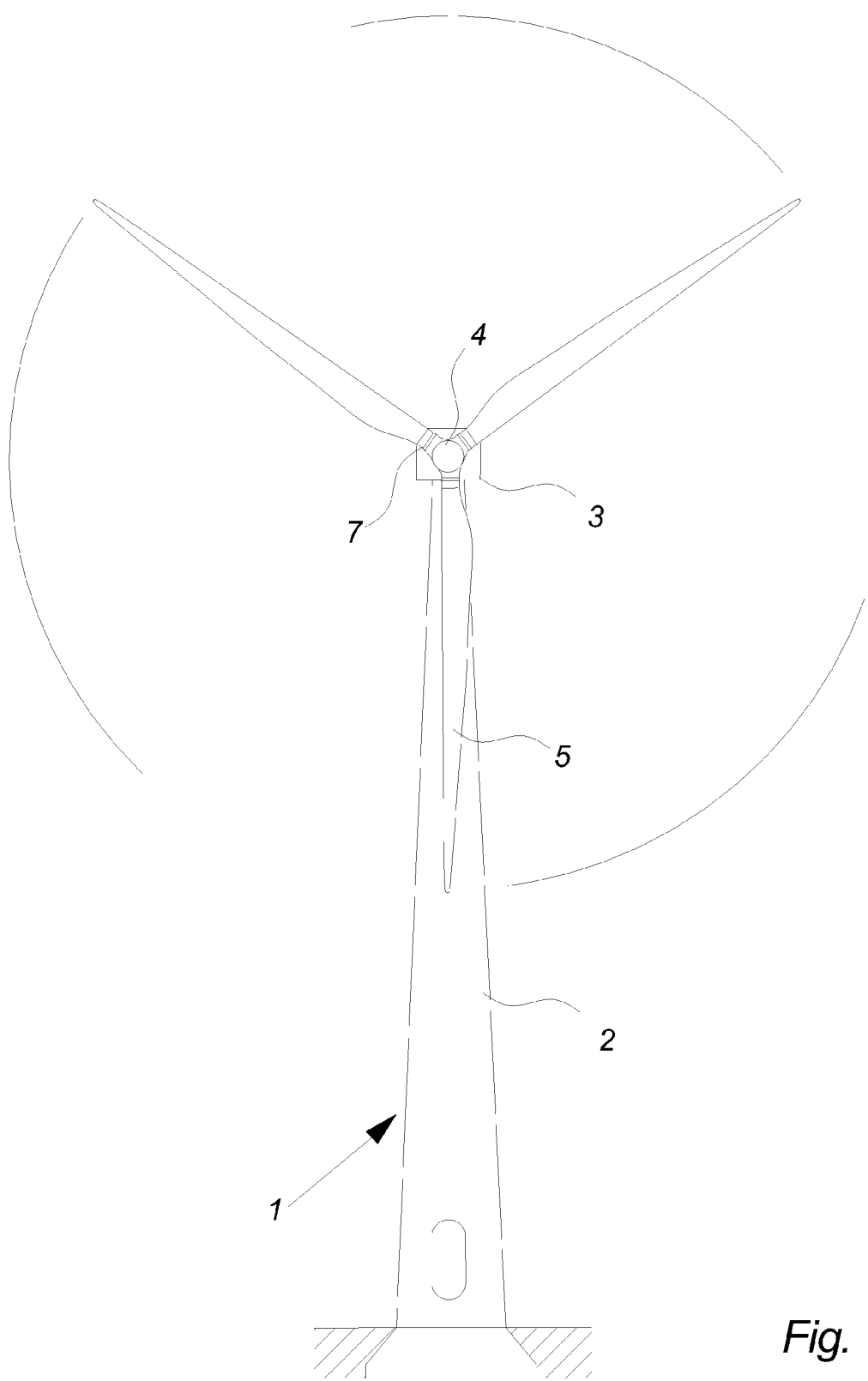
FIG. 1 illustrates a large modern wind turbine as seen from the front.

FIG. 1 illustrates a modern wind turbine 1, comprising a tower 2 and a wind turbine nacelle 3 positioned on top of the tower 2. The wind turbine rotor 4 comprising three wind turbine blades 5 is connected to the nacelle 3 through the low speed shaft which extends from the front of the nacelle 3.

Figure 2:
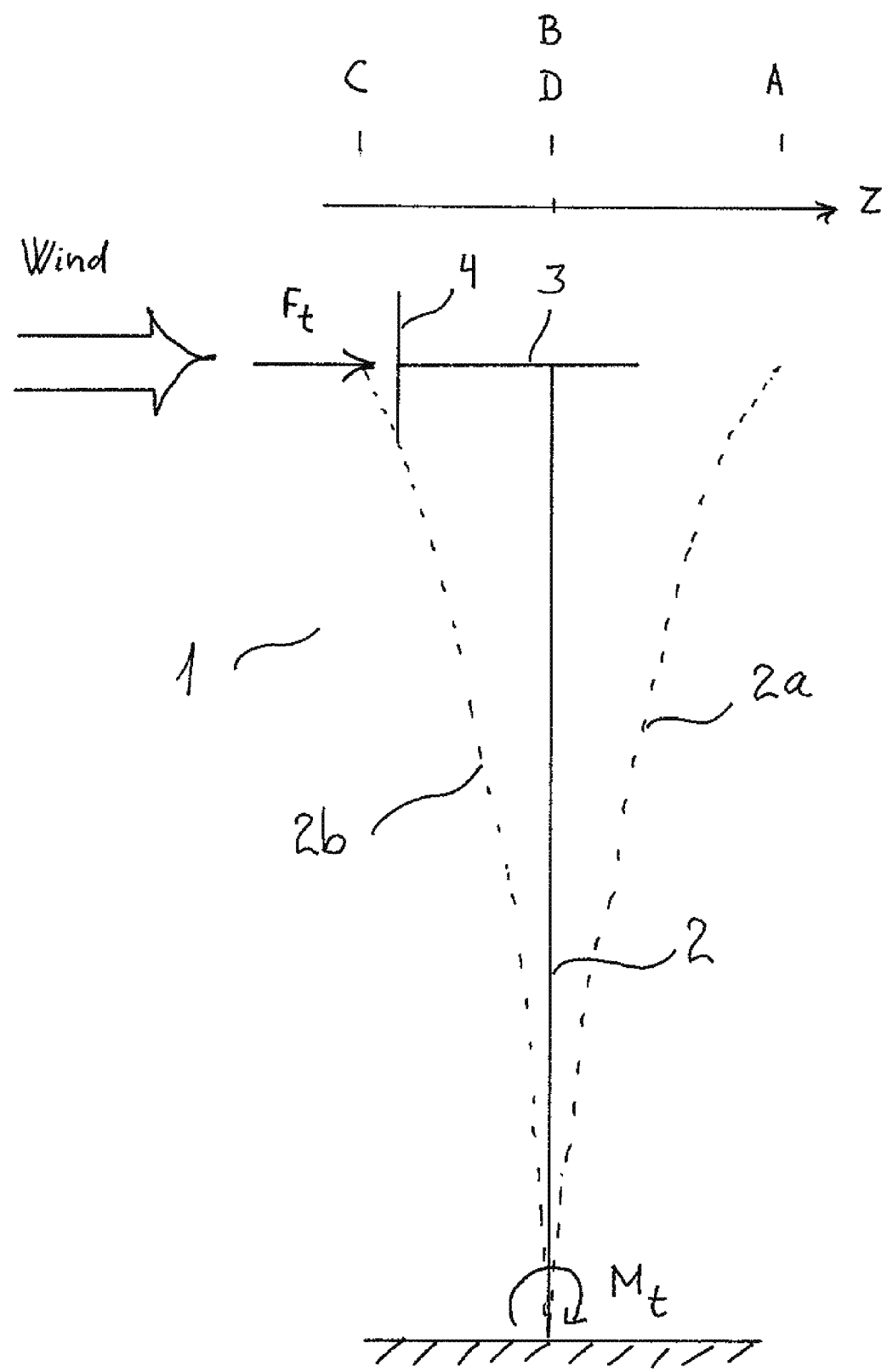
FIG. 2 illustrates the deflection of the wind turbine during a shut-down.

When the wind turbine 1 is in operation, the wind as shown in FIG. 2 provides an aerodynamic acceleration force on the turbine rotor 4, which is converted to the production of output active power from the wind turbine to an electrical distribution grid. The wind also provides an aerodynamic thrust force $F_t$ on the rotor, causing the wind turbine tower 2 to bend in the direction away from the wind to the position shown with the right dotted line 2a, where the top of the tower is in position A and is deflected z, indicating the distance from the top of the tower to position of the top of the tower when the tower is in its vertical position. The thrust force $F_t$ on the rotor gives a bending momentum $M_t$ on the base of the tower. When the shut-down or stop process starts, the top of the tower is at position A. The thrust force is then reduced because the blades of the rotor are pitched further, away from the productive operating position to a position, where the thrust force is substantially zero, i.e. reduced to e.g. +/−10% of the thrust force during normal operation before the stop process or even less. The acceleration force on the rotor is reduced correspondingly. The tower will as a reaction to the reduced thrust force move forward towards the direction of the wind under the influence of the elasticity of the tower, pass the upright, vertical position of the tower, where the top of the tower is at position B where z=0, shown with the left dotted line 2b. The movement of the tower towards the direction of the wind will continue until the extreme position towards the wind is reached and the top is found at position C. Hereafter, the movement of the tower is in the direction of the wind and the tower will again pass the upright, vertical position of the tower, where the top of the tower is at position D where z=0. The movements will continue until it has been damped by aerodynamic damping or actively applied aerodynamic forces. The frequency of the pendulum motion is close to the natural first eigen-frequency of the tower, which however is influenced by the aerodynamic forces acting on the wind turbine.

Figure 3:
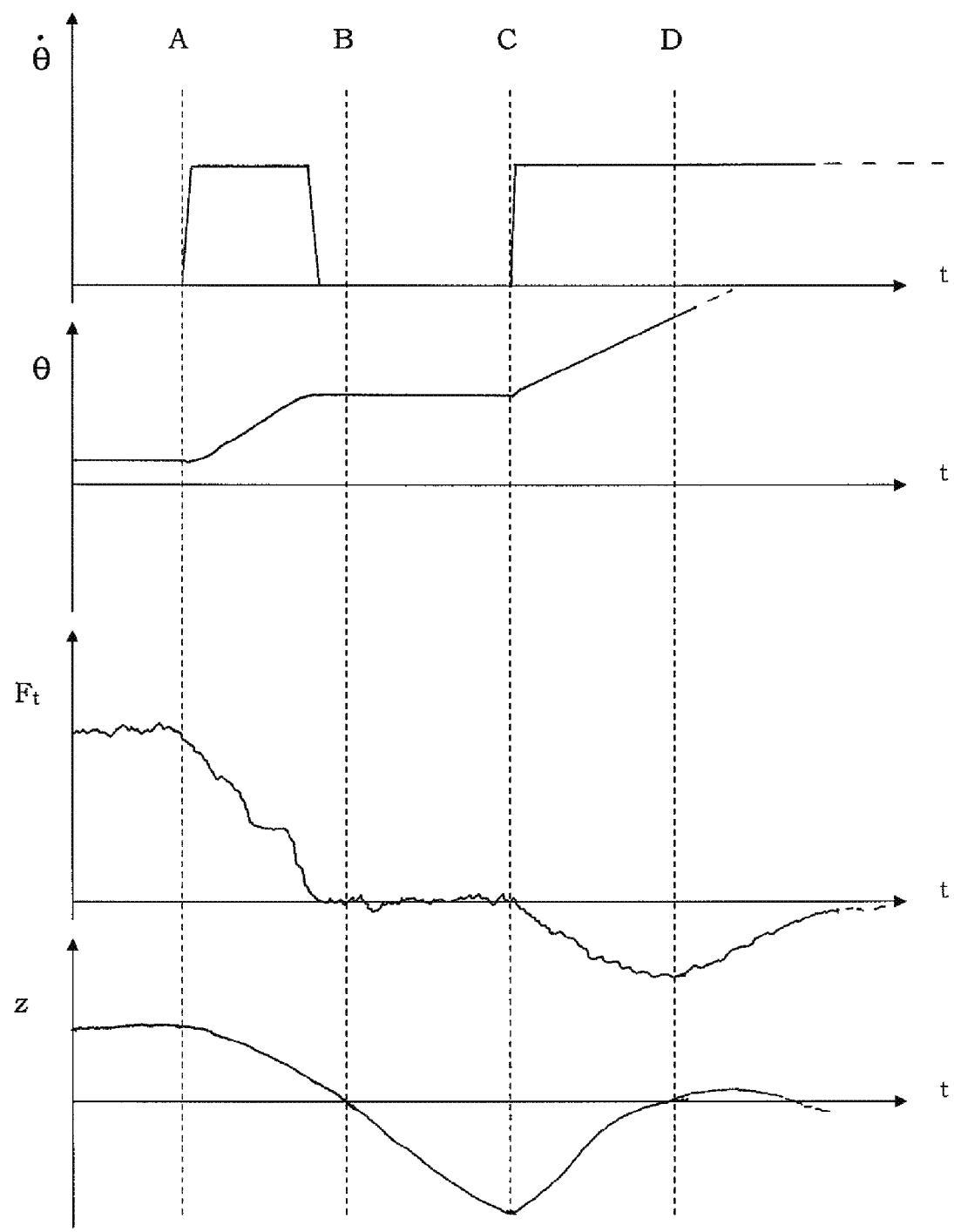
FIG. 3 shows the change of pitch angle, pitch angle, aerodynamic thrust force on the rotor and deflection of a wind turbine during a shut-down according to a first embodiment of the invention.
Figure 4:
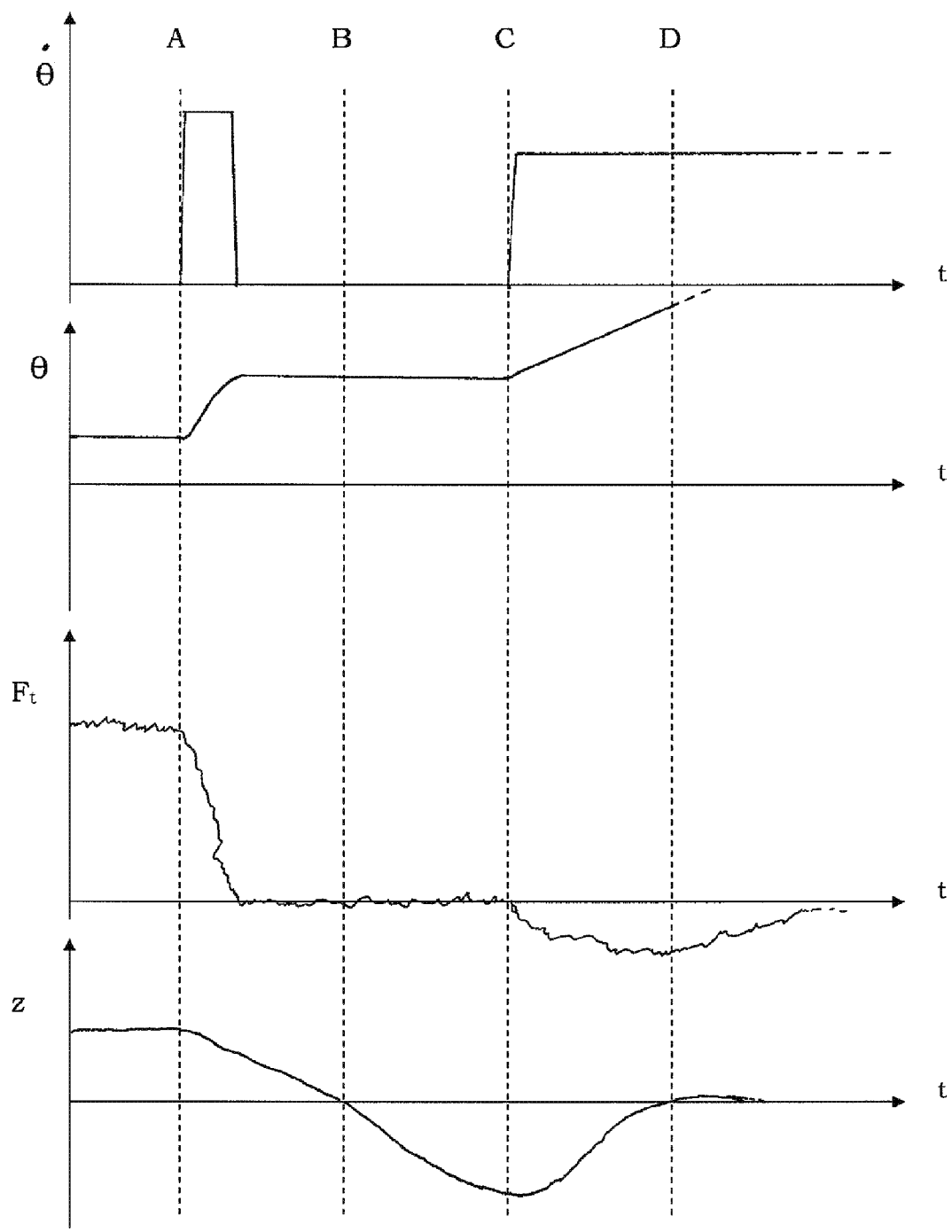
FIG. 4 shows the change of pitch angle, pitch angle, aerodynamic thrust force on the rotor and deflection of a wind turbine during a shut-down according to a second embodiment of the invention.
Figure 5:
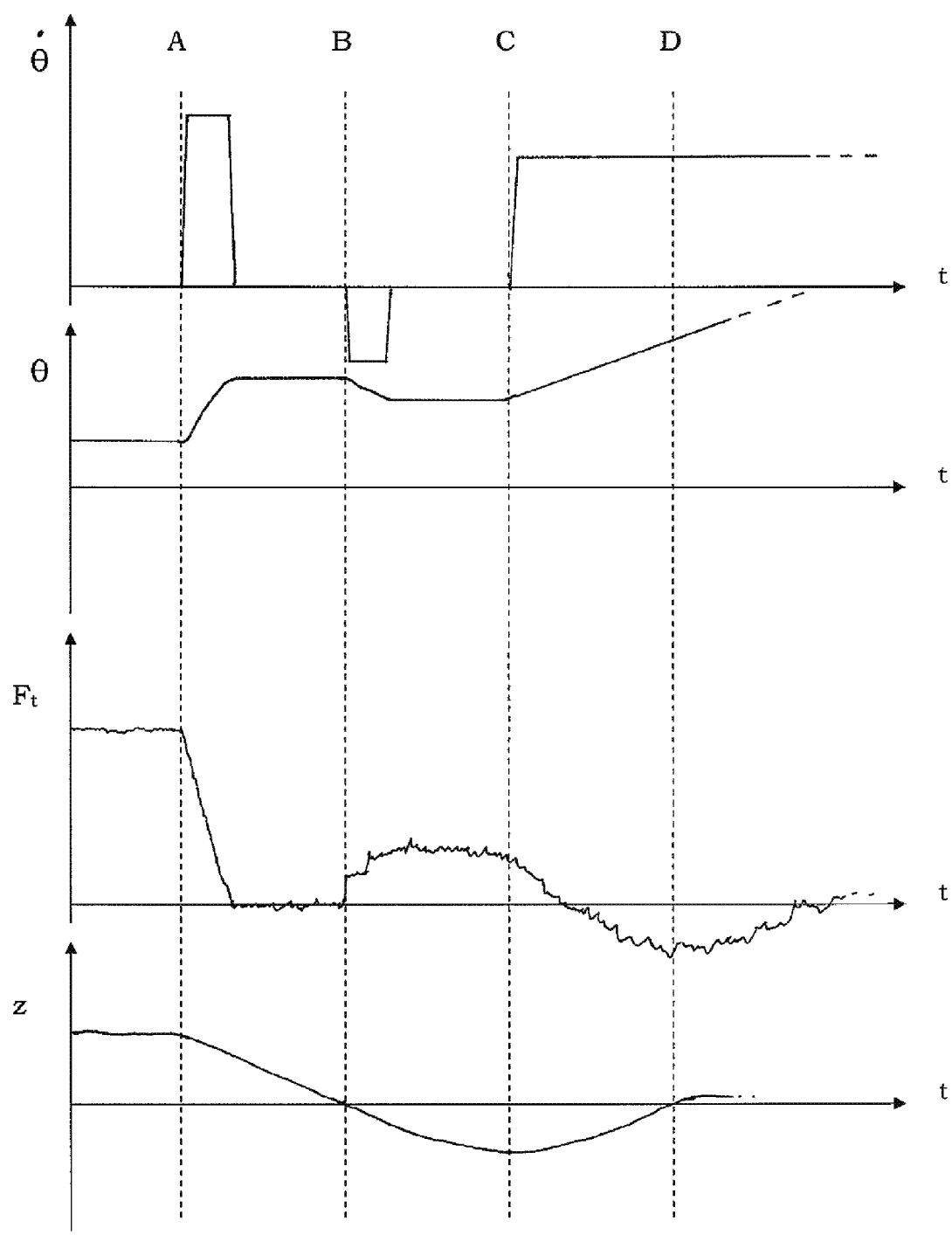
FIG. 5 shows the change of pitch angle, pitch angle, aerodynamic thrust force on the rotor and deflection of a wind turbine during a shut-down according to a third embodiment of the invention.

In FIGS. 3-5, three embodiments of a stop process are shown where the pitch velocity or rate of change of pitch angle $\dot{\theta}$ is depicted in the upper curve as a function of time t, followed by the pitch angle θ which is changing accordingly.

The thrust force $F_t$ is shown in the third curve from above and the position z of the top of the tower as a function of time t is shown in the lowermost curve.

With the first embodiment shown in FIG. 3, the pitch velocity is during the stop process controlled to take either one predetermined value or zero. This could be the case e.g. for a simple and robust emergency stop system. When the stop process starts at A, the pitch velocity is accelerated to this value until a position of substantially zero thrust force is reached. This pitch position of the blades may be found by measurement on the blades or the rotor, e.g. by measuring the deformation of the blades by means of strain gauges on or near the roots of the blades. Alternatively, the position is selected from predetermined knowledge of the optimal pitch angle for reaching the position of substantially no thrust force, optionally found from empirical values and measured speed of rotation of the rotor and/or measured wind speed. The movement of the wind turbine tower continues and the extreme position towards the wind direction is reached at C. Alternatively, the time when the position C may be estimated from the first natural eigen-frequency of the tower and will be about half a period hereof from the onset of the stop process at A or 0.25 to 0.35 times the period hereof from the end of the first pitching action. When the position C is reached, the pitch velocity is accelerated to the predetermined value, which is kept until the blades are feathered, i.e. have reached the parking position at a pitch angle of about 90° (not shown).

The thrust force $F_t$ on the rotor is as a consequence of the pitching reduced from its initial value at normal operation of the wind turbine to a value about zero at the end of the first pitching action starting at A. The no-thrust force state is continued until the upwind extreme position of the tower top is reached at C, where after the renewed pitching action results in a negative thrust force, i.e. against the direction of the wind and in this part of the motion of the tower from position C is against the direction of movement of the tower top, which again results in a reduction of the amplitude of the oscillations or pendulum motion of the tower as shown in the lowermost curve showing the deviation z of the tower top from the vertical position reached at B and D. The thrust force is to a large extent proportional to the acceleration force on the wind turbine rotor for a pitch-controlled, variable speed wind turbine, and an acceleration of the rotation of the rotor is prevented and the negative thrust force will be reflected in a negative acceleration force on the rotor that will break its rotation.

The consequences of the stop process strategy of FIG. 3 are that the amplitude z of the tower top is controlled and an excessive bending moment $M_t$ at the tower root is prevented.

A second stop process strategy is disclosed in FIG. 4, where the initial pitching velocity is higher than at the first embodiment. This requires some more complexity of e.g. a separate emergency rotor stop system having pitch control, but the advantage is that the state of no thrust force is reached faster, i.e. that the period of time from A and to the state of no thrust force is shorter. The aerodynamic acceleration force on the rotor is similarly reduced faster and a risk of possible over-speed of the rotor, e.g. where the stop process is initiated due to a sudden voltage drop on the grid, is reduced.

A yet more advanced strategy for the stop process is shown in FIG. 5. Here, the strategy of FIG. 4 has been further improved by pitching the rotor blades a bit back to provide a positive aerodynamic thrust force to the rotor after the tower top has passed the vertical position B the first time. Hereby, the pendulum motion of the tower is dampened very early, and the resulting amplitude z at the upwind extreme position C of the tower top is reduced and is much lower in absolute magnitude than the initial deviation z at the starting position A of the tower top. This strategy provides a significantly improved control of the tower oscillation but has the drawback that the rotor is accelerated towards a higher speed of rotation due to a positive aerodynamic acceleration force between the positions B and C. However, this may be compensated by use of another means for breaking the rotation of the rotor, such as e.g. a mechanical brake applied to the main shaft of the rotor.

The pitching velocity is not necessarily zero after the no-thrust position of the blades is reached the first time after the tower position A. In a more advanced embodiment, the pitch angle of the blades is continuously adjusted based on inputs from the sensors of the wind turbine in order to uphold the no-thrust condition and compensate for e.g. wind gusts and change of rotational speed of the rotor.

The pitching rates shown in the three examples are held constant during given periods of time. However, in a further embodiment, the pitching rates are varying and may even be adjusted to the given operational situation, taking e.g. wind speed and rotational speed of the rotor into account.

The control system for performing the stop process is in a first embodiment an integrated part of the pitch control system of the wind turbine. The control system comprises means for detecting a measure for the aerodynamic thrust on the rotor, which e.g. may be strain gauge measurements of the deformation of the blades or the main shaft of the rotor as a result of the torque, which is a measure of the aerodynamic acceleration force on the rotor which is substantially proportional to the aerodynamic thrust force on the rotor. Alternatively, the power output from the generator may be used as a measure of the aerodynamic acceleration force and thereby of the thrust force on the rotor. The control system furthermore comprises means for detection of a measure for the position and/or the velocity of the wind turbine tower in its pendulum movement. An inertial position system may be used in combination with an absolute positioning system, such as a satellite based system, e.g. the Global Positioning System (GPS). The absolute positioning system is employed to detect the absolute deviation z at the initial starting point A of the stop process from the vertical position. Absolute positioning systems are generally slow in updating the absolute position to be able to efficiently follow the motion of the tower with sufficient accuracy, but an inertial positioning system having an accelerometer and an integrating routine to calculate velocity and absolute position may be used to detect the extreme positions, such as C, where the velocity is zero, as well as the vertical positions B, D. Alternatively, the position and/or velocity may be detected from a suitable absolute positioning system alone or an inertial positioning system alone. As a further alternative, which may be combined with one or both of the two others, means for measuring the angular deviation of the top of the tower from vertical may be employed, comprising one or more gyroscopes or angular rate sensors and/or magnetic sensors detecting the angular position with respect to the magnetic earth field.

In a second embodiment, the control system for performing the stop process is a separate emergency stop system which controls emergency pitch control means, such as a set of hydraulic pitch actuators acting on the blades of the rotor by controlling valves connecting the actuators with a hydraulic storage means, which is known per se. Alternatively, electrical actuators may be employed driven by an electric emergency battery arrangement. The control system may comprise means for detecting the position of the top of the tower as described with reference to the first embodiments discussed above. Alternatively, the control system may operate from a set of predefined values or settings based on the eigen-frequency of the wind turbine tower, a type of control that is less precise than the measurement based control but is much more robust to malfunctions in the wind turbine and which to a large extent may produce a satisfactory result in controlling the pitching of the rotor blades in order to avoid excessive bending moments at the tower root.

The skilled person may from the above description of examples know how to combine these with each other and the known technique in the art to obtain a plurality of different systems to work the present invention as defined in the appended claims.

What is claimed is:

1. A method for controlling a pitch angle of blades of a wind turbine rotor of a wind turbine during a stop process of the rotor from an operating state, where a wind turbine tower is deflected in a downwind direction due to aerodynamic thrust force on the rotor, the method comprising:
    pitching the blades to a position where the aerodynamic thrust force on the rotor is substantially zero;
    maintaining the blades at the position where the aerodynamic thrust force on the rotor is substantially zero for a predetermined time period; and
    finally pitching the blades to a feathered position.

2. The method according to claim 1, further comprising maintaining the blades at a position where the aerodynamic thrust force on the rotor is substantially zero at least until the tower of the wind turbine has reached a substantially vertical position.

3. The method according to claim 1, wherein the blades are maintained at the position where the aerodynamic thrust force on the rotor is substantially zero by means of a repeated adjustment of the pitch angle of the blades controlled based on the step of determining a measure of the aerodynamic thrust force on the rotor.

4. The method according to claim 1, further comprising:
    determining a measure of the aerodynamic thrust force on the rotor; and
    controlling said pitching of the blades to a position where the aerodynamic thrust force on the rotor is substantially zero in response thereto.

5. A wind turbine comprising a control system arranged for controlling a stop process of the wind turbine rotor according to the method of claim 1.

6. The wind turbine according to claim 5, wherein said control system constitutes a safety stop system operating independently from a pitch control system of the wind turbine.

7. The method according to claim 1, further comprising controlling the aerodynamic thrust force on the rotor to be either substantially zero or to be against a direction of movement of the tower in its first natural eigen-frequency mode, at least until the tower of the wind turbine has reached a substantially vertical position after having reached an extreme deflection position in an upwind direction.

8. The method according to claim 7, wherein the aerodynamic thrust force on the rotor is controlled to be either substantially zero or to be against the direction of movement of the tower in its first natural eigen-frequency mode, at least until the tower of the wind turbine again has reached an extreme deflection position in a downwind direction.

9. The method according to claim 7, comprising pitching the blades to a position where the aerodynamic thrust force on the rotor is directed in the upwind direction when the tower from initial bending has reached an opposite extreme bending position in the upwind direction.

10. The method according to claim 7, further comprising:
    pitching the blades to a position where the aerodynamic thrust force on the rotor is directed in a downwind direction when the tower from initial bending has reached a substantially vertical position.

11. The method according to claim 7, further comprising:
    determining a measure of movement of a top of the tower; and
    controlling the aerodynamic thrust for on the rotor based on the movement of the top of the tower.

12. The method according to claim 11, wherein determining a measure of the movement of the top of the tower includes determining a velocity of the top of the tower.

13. The method according to claim 1, further comprising:
    determining the eigen-frequency of the wind turbine; and
    setting the predetermined time period based on the first natural eigen-frequency of the wind turbine.

14. The method according to claim 13, wherein setting the predetermined time period further comprises setting the predetermined time period to be in the range of 0.2 to 0.4 times the period of the first natural eigen-frequency of the wind turbine tower bending mode.

15. The method of claim 14, where the predetermined time period is in the range of 0.25 to 0.35 times the period of the first natural eigen-frequency of the wind turbine tower bending mode.

* * * * *

UNITED STATES PATENT AND TRADEMARK OFFICE
CERTIFICATE OF CORRECTION

| | |
|---|---|
| PATENT NO. | : 8,123,477 B2 |
| APPLICATION NO. | : 12/687719 |
| DATED | : February 28, 2012 |
| INVENTOR(S) | : Lars Risager et al. |

It is certified that error appears in the above-identified patent and that said Letters Patent is hereby corrected as shown below:

In the Specifications:
Column 1, line 31 reads "of problems" and should read --or problems--.
Column 3, line approx. 8 reads "that" and should read --than--.
Column 4, line 49 reads "pass" and should read --past--.

In the Claims:
Column 8, line 29 (claim 11) reads "for" and should read --force--.

Signed and Sealed this
Twenty-fifth Day of February, 2014

Michelle K. Lee
*Deputy Director of the United States Patent and Trademark Office*